Patented Mar. 23, 1948

2,438,402

UNITED STATES PATENT OFFICE 2,438,402

PREPARATION OF CYCLOPENTADIENE

Robert M. Kennedy, Drexel Hill, and Stanford J. Hetzel, Cheltenham, Pa., assignors to Sun Oil Company, Philadelphia, Pa., a corporation of New Jersey No Drawing. Application August 19, 1947, Serial No. 769,522

5 Claims. (Cl. 260—666)

1

This invention relates to cyclization. Specifically it relates to the dehydrogenation and cyclization of dehydrogenatable hydrocarbons, having 5 carbon atoms per molecule, especially 1,3 pentadiene. More specifically the invention is concerned with a commercially feasible process for the conversion of pentane or 1,3 pentadiene to 1,3 cyclopentadiene.

As stated, the invention is applicable to the dehydrogenation and cyclization of pentane to 1,3 cyclopentadiene. This conversion is considered to take place by way of 1-pentene and 1,3 pentadiene. Accordingly, the invention will be described with reference to the conversion of 1,3 pentadiene to 1,3 cyclopentadiene to which it is pre-eminently suited. These reactions can be represented as follows:

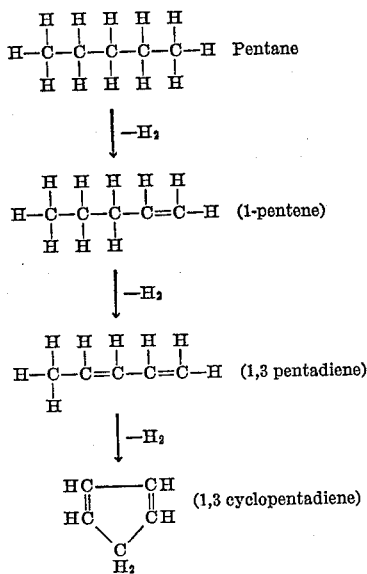

According to the invention, 1,3 pentadiene in pure form, or admixed with normal pentane and/or normal pentenes, or other gases, is contacted with fused alumina at an elevated temperature for a time sufficient to effect a desired extent of conversion to 1,3 cyclopentadiene.

The contact mass employed according to the invention is essentially fused alumina. A fused alumina which has been found suited to the practice of the invention is sold in the trade under the name "Alfrax." Obviously equivalent fused aluminas can be employed. The contact mass is preferably in a subdivided state.

The temperature employed for the dehydro-

2 genation of the hydrocarbon, in the instant case 1,3 pentadiene, will vary depending upon the other conditions of operation and on the nature or purity of the charging stock. However, the conversion of 1,3 pentadiene can be advantageously effected at a temperature within the range 300° C. to a temperature above which substantial decomposition of the hydrocarbon will take place. More specifically a temperature within the range 400° C.–700° C., preferably 450° C.–650° C., can be employed.

While the conversion per pass is substantially independent of pressure it has been found that lower pressures seem to form higher yields on recycling. Accordingly, while higher and lower pressures are not excluded from the scope of the invention, pressures in the range of 1000 mm. Hg–10 mm. Hg, preferably 200 mm. Hg–10 mm. Hg, can be employed.

The time of contact of the 1,3 pentadiene with the fused alumina is a factor to be considered. There is an optimum range of contact time corresponding to charging rates of 0.25 gram/minute/100 grams–10 grams/minute/100 grams of fused alumina. However, higher and lower charging rates are not excluded from the scope of the invention.

Example

Three hundred and fifty grams of 1,3 pentadiene were charged at a rate of 10 grams/minute at a pressure of about 20 mm. Hg to 1000 grams of fused alumina in a conversion tube at a temperature of 600° C. The effluent from the conversion tube was cooled, condensed and fractionated resulting in a yield of about 30 grams of 1,3 cyclopentadiene. On recycle of the unconverted 1,3 pentadiene the yield is about 108 grams.

The contact mass can be regenerated indefinitely to substantially its original activity.

The particle or pellet size can be varied. About 4 to 8 mesh has been found quite satisfactory. Obviously the particle size should not be too small in the sense that a large pressure drop across the contact mass is to be avoided if substantially the same pressure in all parts of the apparatus is desired, unless fluid or fluidized operation is employed.

It will be apparent to those versed in the art that modification and variation are possible within the scope of the invention as defined in the appended claims, the essence of the invention being in that dehydrogenatable hydrocarbons having 5 carbon atoms per molecule can be dehydrogenated and cyclized by contacting the same at elevated temperature and suitable pressure with fused alumina as set forth herein and in the appended claims.

We claim:

1. A process for the dehydrogenation and cyclization of 1,3 pentadiene to 1,3 cyclopentadiene which comprises contacting 1,3 pentadiene with fused alumina at a temperature of at least about 300° C. but not substantially above a temperature at which substantial decomposition of hydrocarbons present will take place for a time sufficient to effect a desired extent of conversion.

2. A process for the dehydrogenation and cyclization of 1,3 pentadiene to 1,3 cyclopentadiene which comprises contacting 1,3 pentadiene with fused alumina at a temperature within the range 400° C.–700° C. for a time sufficient to effect a desired extent of conversion.

3. A process according to claim 2 wherein the pressure is in the range 1000 mm. Hg–10 mm. Hg.

4. A process for the dehydrogenation and cyclization of 1,3 pentadiene to 1,3 cyclopentadiene which comprises contacting 1,3 pentadiene with fused alumina at a temperature within the range 450° C.–650° C. at a pressure within the range 200 mm. Hg–10 mm. Hg for a time sufficient to effect a desired extent of conversion.

5. A process according to claim 4 wherein the charging rate of 1,3 pentadiene to the contact mass is within the range 0.25–10 grams/minute/100 grams of fused alumina.

ROBERT M. KENNEDY.
STANFORD J. HETZEL.

REFERENCES CITED

The following references are of record in the file of this patent:

UNITED STATES PATENTS

| Number | Name | Date |
| --- | --- | --- |
| 2,402,277 | Frey | June 16, 1946 |